(12) United States Patent
Matsukura et al.

(10) Patent No.: US 12,397,345 B2
(45) Date of Patent: Aug. 26, 2025

(54) POWDER FOR FILM FORMATION OR SINTERING

(71) Applicant: MITSUI MINING & SMELTING CO., LTD., Tokyo (JP)

(72) Inventors: Kento Matsukura, Omuta (JP); Shuichi Tateoka, Omuta (JP); Hirochika Ogawa, Omuta (JP)

(73) Assignee: MITSUI MINING & SMELTING CO., LTD. (JP)

( * ) Notice: Subject to any disclaimer, the term of this patent is extended or adjusted under 35 U.S.C. 154(b) by 177 days.

(21) Appl. No.: 17/914,026

(22) PCT Filed: Mar. 18, 2021

(86) PCT No.: PCT/JP2021/011176
§ 371 (c)(1),
(2) Date: Sep. 23, 2022

(87) PCT Pub. No.: WO2021/229914
PCT Pub. Date: Nov. 18, 2021

(65) Prior Publication Data
US 2023/0133847 A1    May 4, 2023

(30) Foreign Application Priority Data
May 12, 2020 (JP) ................. 2020-084052

(51) Int. Cl.
*B22F 1/00* (2022.01)
*C01F 17/34* (2020.01)
*C23C 4/11* (2016.01)

(52) U.S. Cl.
CPC ............... *B22F 1/00* (2013.01); *C01F 17/34* (2020.01); *C23C 4/11* (2016.01); *C01P 2002/74* (2013.01);
(Continued)

(58) Field of Classification Search
None
See application file for complete search history.

(56) References Cited

U.S. PATENT DOCUMENTS

2003/0049499 A1* 3/2003 Murakawa .............. C04B 35/44
428/697
2003/0059653 A1* 3/2003 Yamada ................... C23C 4/11
427/427
(Continued)

FOREIGN PATENT DOCUMENTS

JP        11157916 A   *  6/1999
JP        H11-157916 A    6/1999
(Continued)

OTHER PUBLICATIONS

English-language translation of the Written Opinion of the International Searching Authority (Form PCT/ISA/237) for PCT/JP2021/011176, May 11, 2021, 4 pages. (Year: 2021).*
(Continued)

*Primary Examiner* — Anthony J Zimmer
*Assistant Examiner* — Zachary John Baum
(74) *Attorney, Agent, or Firm* — Harness, Dickey & Pierce, P.L.C.

(57) ABSTRACT

A powder for coating or sintering exhibits a peak assigned to orthorhombic $YAlO_3$ in an X-ray diffractometry. Of peaks exhibited in the X-ray diffractometry, the peak assigned to the (112) plane of orthorhombic $YAlO_3$ is a peak that has the highest peak intensity. Preferably, the value of the ratio of S2 to S1, S2/S1, is less than 1 in an X-ray diffractometry using CuKα radiation, where SI represents the peak intensity of the peak assigned to the (112) plane of orthorhombic $YAlO_3$ and S2 represents the peak intensity of the peak assigned to the (104) plane of trigonal $Al_2O_3$.

7 Claims, 1 Drawing Sheet

(52) U.S. Cl.
CPC ...... *C01P 2002/76* (2013.01); *C01P 2004/61* (2013.01); *C01P 2006/12* (2013.01); *C01P 2006/14* (2013.01); *C01P 2006/16* (2013.01)

(56) References Cited

U.S. PATENT DOCUMENTS

| | | |
|---|---|---|
| 2004/0067392 A1 | 4/2004 | Yamada et al. |
| 2006/0116274 A1 | 6/2006 | Kitamura et al. |
| 2006/0182969 A1 | 8/2006 | Kitamura et al. |
| 2013/0299749 A1 | 11/2013 | Tsutsumi et al. |

FOREIGN PATENT DOCUMENTS

| | | |
|---|---|---|
| JP | 2000-044235 A | 2/2000 |
| JP | 2013-224226 A | 10/2013 |
| JP | 6659073 B1 * | 3/2020 ............ C01F 17/34 |
| TW | I232174 B | 5/2005 |

OTHER PUBLICATIONS

Gatzen, C., et al. YAlO3—A novel environmental barrier coating for Al2O3/Al2O3-ceramic matrix composites. Coatings 2019, 9, 609. (Year: 2019).*

Materials Project. YAlO3. Data retrieved from the Materials Project for YAlO3 (mp-3792) from database version v2023.11.1. (Year: 2023).*

International Search Report (English and Japanese) issued in PCT/JP2021/011176, mailed May 11, 2021; ISA/JP (5 pages).

Caren Gatzen et al. "YAlO3—A Novel Environmental Barrier Coating for Al2O3/Al2O3-Ceramic Matrix Composites"; Coatings; vol. 9, 609th; published on Sep. 25, 2019; pp. 1-13 (total 13 pages).

* cited by examiner

POWDER FOR FILM FORMATION OR SINTERING

CROSS REFERENCE TO RELATED APPLICATIONS

This application is a U.S. National Phase Application under 35 U.S.C. 371 of International Application No. PCT/JP2021/011176, filed on Mar. 18, 2021, which claims priority to Japanese Patent Application No. 2020-084052, filed on May 12, 2020. The entire disclosures of the above applications are expressly incorporated by reference herein.

BACKGROUND

Technical Field

The present invention relates to a powder for coating or sintering.

Related Art

In the fabrication of semiconductor devices, a halogen-based gas is used in an etching process. In order to prevent corrosion of an etching apparatus due to the halogen-based gas, generally, a coating formed of a highly corrosion-resistant substance is applied to the inner side of the etching apparatus by thermal spraying. A material that contains an yttrium-aluminum complex oxide, such as yttrium-aluminum-garnet (YAG), is known as an example of the highly corrosion-resistant substance.

For example, US 2006/116274A1 discloses a thermal spraying powder including a double oxide, wherein, when X-ray diffraction of the thermal spraying powder is measured, the ratio of the intensity of an X-ray diffraction peak of a (222) plane of yttria to the intensity of the maximum peak among an X-ray diffraction peak of a (420) plane of a garnet phase of the double oxide, an X-ray diffraction peak of a (420) plane of a perovskite phase of the double oxide, and an X-ray diffraction peak of a (−122) plane of a monoclinic phase of the double oxide is 20% or less.

US 2006/182969A1 discloses a thermal spraying powder including granulated and sintered particles of an yttrium-aluminum double oxide obtained by granulating and sintering a raw powder containing yttrium and aluminum, wherein the total volume of fine pores having a diameter of 6 μm or less in the granulated and sintered particles is 0.06 to 0.25 cm$^3$/g.

Also, the applicant has previously proposed a powder for coating or sintering, the powder exhibiting a peak assigned to cubic $Y_3Al_5O_{12}$ and a peak assigned to orthorhombic $YAlO_3$ in X-ray diffractometry, wherein an intensity ratio of a peak assigned to the (112) plane of orthorhombic $YAlO_3$ to a peak assigned to the (420) plane of cubic $Y_3Al_5O_{12}$ is at least 0.01 and less than 1. This powder can easily form a coating or a sintered material that is highly corrosion resistant against plasma etching.

However, coatings obtained by thermal spraying the powders disclosed in US 2006/116274A1 and US 2006/182969A1 have insufficient corrosion resistance against halogen-based plasma.

When the powder disclosed in Japanese Patent No. 6659073 is produced, the Y/Al ratio thereof is controlled so as to be higher than that of yttrium-aluminum-garnet $Y_3Al_5O_{12}$, mainly in order to suppress the formation of trigonal $Al_2O_3$, which has low resistance against halogen-based plasma. Owing to this, the powder disclosed in Japanese Patent No. 6659073 may exhibit a peak assigned to yttrium oxide. However, in the actual production process, it is difficult to control the yttrium oxide content as desired. As a result, the yttrium oxide content of the complex oxide powder containing aluminum and yttrium may vary. For example, a high yttrium oxide content causes problems including an increase in etching rate in etching with halogen-based plasma.

Therefore, the present invention provides a powder for coating or sintering that has even more improved corrosion resistance against plasma etching, compared with those of the above-described related art.

SUMMARY

The inventors of the present invention have conducted in-depth study on a composition of an yttrium-aluminum complex oxide powder, for facilitating the production of a stable product and also for effectively improving the corrosion resistance against plasma etching with a halogen-based gas, and, as a result, have found that it is possible to effectively improve the corrosion resistance by adopting a specific composition.

The present invention has been made based on the above-described findings, and provides a powder for coating or sintering,
wherein, in an X-ray diffractometry of the powder, a peak assigned to orthorhombic $YAlO_3$ is exhibited, and
of peaks exhibited in the X-ray diffractometry, a peak assigned to a (112) plane of orthorhombic $YAlO_3$ is the highest peak.

Also, the present invention provides a method for producing a coating, the method including forming a coating of the above-described powder for coating or sintering, by thermal spraying or PVD, and also provides a coating of the above-described powder for coating or sintering, the coating formed by thermal spraying or PVD.

Furthermore, the present invention provides use of a powder for coating or sintering, wherein, in an X-ray diffractometry of the powder, a peak assigned to orthorhombic $YAlO_3$ is exhibited, and of peaks exhibited in the X-ray diffractometry, a peak assigned to a (112) plane of orthorhombic $YAlO_3$ is the highest peak.

DETAILED DESCRIPTION

Hereinafter, the present invention will be described based on preferred embodiments thereof. The powder for coating or sintering of the present invention (hereinafter also referred to as the "powder of the present invention") contains a complex oxide containing yttrium and aluminum.

Composition of Powder for Coating or Sintering

When the powder of the present invention is subjected to an X-ray diffractometry, a diffraction peak assigned to orthorhombic $YAlO_3$ is exhibited. The powder of the present invention, which exhibits such a diffraction peak, has high corrosion resistance against plasma etching with a halogen-based gas. $YAlO_3$ is known to have two phases, cubic and orthorhombic. The inventors of the present invention have found that a film or a sintered material formed by using a powder containing orthorhombic $YAlO_3$, of these two phases, is extremely stable against plasma etching with a halogen-based gas.

In view of improving the corrosion resistance against plasma etching with a halogen-based gas, the powder of the present invention preferably consists of orthorhombic $YAlO_3$. However, the powder of the present invention may contain another oxide in addition to orthorhombic $YAlO_3$, as long as the corrosion resistance is not impaired. For cases where the powder of the present invention contains the other oxide in addition to orthorhombic $YAlO_3$, examples of the other oxide include cubic $Y_3Al_5O_{12}$, monoclinic $Y_4Al_2O_9$, trigonal $Al_2O_3$, and cubic $Y_2O_3$. Whether or not the powder of the present invention contains cubic $Y_3Al_5O_{12}$, monoclinic $Y_4Al_2O_9$, trigonal $Al_2O_3$, and cubic $Y_2O_3$ can be checked by analyzing the powder of the present invention by an X-ray diffractometry.

It is preferable that in the X-ray diffractometry of the powder of the present invention, a peak assigned to an alumina phase should not be exhibited, or should be very small, if any, in view of improving the corrosion resistance against plasma etching with a halogen-based gas. From this point of view, in a case where a peak assigned to trigonal $Al_2O_3$ is exhibited in addition to a peak of orthorhombic $YAlO_3$ in the X-ray diffractometry of the powder of the present invention using CuKα radiation, the value of the ratio of S2 to S1, S2/S1, is preferably less than 1, where S1 represents the peak intensity of the peak assigned to the (112) plane of orthorhombic $YAlO_3$ and S2 represents the peak intensity of the peak assigned to the (104) plane of trigonal $Al_2O_3$. The reason for this is that orthorhombic $YAlO_3$ is likely to appear as a stable phase in a coating or a sintered material obtained from a powder having an S2/S1 value of less than 1, and that the coating or the sintered material thus has improved corrosion resistance against plasma etching with a halogen-based gas. An additional reason for this is that, when $YAlO_3$ is orthorhombic, a coating or a sintered material having a composition that is stable against halogen-based plasma is likely to be obtained. In view of obtaining these advantages more markedly, the value of S2/S1 is preferably 0.1 or less, and more preferably 0.01 or less, or most preferably, the peak assigned to the (104) plane of trigonal $Al_2O_3$ is not exhibited.

In a case where a peak assigned to cubic $Y_3Al_5O_{12}$ or a peak assigned to monoclinic $Y_4Al_2O_9$ is exhibited in addition to a peak assigned to orthorhombic $YAlO_3$ in the X-ray diffractometry of the powder of the present invention using CuKα, radiation, the value of the ratio of S3 to S1, S3/S1, and the value of the ratio of S4 to S1, S4/S1, are each independently preferably less than 1, where S1 represents the peak intensity of the peak assigned to the (112) plane of orthorhombic $YAlO_3$, S3 represents the peak intensity of the peak assigned to the (420) plane of cubic $Y_3Al_5O_{12}$, and S4 represents the peak intensity of the peak assigned to the (−221) plane of monoclinic $Y_4Al_2O_9$. The reasons for this are as follows: in the powder of the present invention, (a) orthorhombic $YAlO_3$ is likely to appear as a stable phase; (b) orthorhombic $YAlO_3$ has the highest density among yttrium-aluminum complex oxides, and accordingly, a coating or a sintered material containing orthorhombic $YAlO_3$ has high hardness, in other words, has high resistance to physical etching; and (c) when compared with a single composition of cubic $Y_3Al_5O_{12}$, which also has high hardness, orthorhombic $YAlO_3$ is a composition that contains a larger amount of yttrium component, which is known to have high resistance against halogen-based plasma.

In view of improving the corrosion resistance against plasma etching with a halogen-based gas even more, the values of S3/S1 and S4/S1 are each independently preferably less than 0.5, more preferably 0.2 or less, and even more preferably 0.1 or less, or most preferably, the peak assigned to the (420) plane of cubic $Y_3Al_5O_{12}$ or the peak assigned to the (−221) plane of monoclinic $Y_4Al_2O_9$ is not exhibited.

In view of sufficient corrosion resistance against halogen-based plasma, it is preferable that $Y_2O_3$ should not be contained in the powder of the present invention, or should be contained in a trace amount, if any. From this point of view, in the X-ray diffractometry of the powder of the present invention using CuKα radiation, the value of the ratio of S5 to S1, S5/S1, is preferably 1 or less, where S1 represents the peak intensity of the peak assigned to the (112) plane of orthorhombic $YAlO_3$, and S5 represents the peak intensity of the peak assigned to the (222) plane of cubic $Y_2O_3$.

In view of improving the corrosion resistance against plasma etching with a halogen-based gas even more, the value of S5/S1 is preferably 0.1 or less, and more preferably 0.01 or less, or most preferably, the peak assigned to the (222) plane of cubic $Y_2O_3$ is not exhibited.

In an X-ray diffractometry using CuKα radiation, the peak assigned to the (112) plane of orthorhombic $YAlO_3$ is exhibited at or near 2θ=34°. Specifically, it is exhibited within a range of 2θ=34.2°±0.4°.

In an X-ray diffractometry using CuKα radiation, the peak assigned to the (104) plane of trigonal $Al_2O_3$ is usually exhibited at or near 2θ=35°. Specifically, it is exhibited within a range of 2θ=35.2°±0.4°.

In an X-ray diffractometry using CuKα radiation, the peak assigned to the (420) plane of cubic $Y_3Al_5O_{12}$ is usually exhibited at or near 2θ=33°. Specifically, it is exhibited within a range of 2θ=33.3°±0.4°.

In an X-ray diffractometry using CuKα radiation, the peak assigned to the (−221) plane of monoclinic $Y_4Al_2O_9$ is usually exhibited at or near 2θ=30°. Specifically, it is exhibited within a range of 2θ=29.6°±0.15°.

In an X-ray diffractometry using CuKα radiation, the peak assigned to the (222) plane of cubic $Y_2O_3$ is usually exhibited at or near 2θ=29°. Specifically, it is exhibited within a range of 2θ=29.2°±0.15°.

Of peaks exhibited when the powder of the present invention is analyzed by an X-ray diffractometry using CuKα radiation with a scan range of 2θ=20° to 60°, a peak assigned to orthorhombic $YAlO_3$ is preferably a peak that has the highest peak intensity. More preferably, of peaks exhibited when the powder of the present invention is analyzed by the X-ray diffractometry, the peak assigned to the (112) plane of orthorhombic $YAlO_3$ is a peak that has the highest peak intensity.

It is preferable that substantially no peaks assigned to components x other than $YAlO_3$, $Y_3Al_5O_{12}$, $Y_4Al_2O_9$, $Al_2O_3$, or $Y_2O_3$ should be exhibited in an X-ray diffractometry of the powder of the present invention, in view of improving the corrosion resistance even more. Within a scan range of 2θ=20° to 60°, the value of the ratio of Sx to S1, Sx/S1, is preferably 0.1 or less, and more preferably 0.01 or less, where Sx represents the peak intensity of a peak assigned to a component x other than $YAlO_3$, $Y_3Al_5O_{12}$, $Y_4Al_2O_9$, $Al_2O_3$, or $Y_2O_3$, and S1 represents the peak intensity of the peak assigned to the (112) plane of orthorhombic $YAlO_3$. Most preferably, the value of Sx/S1 is 0.

Crystallite Size

The crystallite size of the powder of the present invention is preferably 50 nm or greater, as determined from the full width at half maximum of the peak assigned to the (112) plane of orthorhombic $YAlO_3$. With such a crystallite size of the powder of the present invention, the crystallinity of orthorhombic $YAlO_3$ in a coating or a sintered material to be obtained can be improved, and the corrosion resistance of the coating or the sintered material can thus be improved even more. From this viewpoint, the crystallite size is preferably 60 nm or greater, more preferably 70 nm or greater, and even more preferably 80 nm or greater. On the other hand, the crystallite size is preferably 110 nm or less, and more preferably 105 nm or less, in view of the ease of production of the powder of the present invention and a reduction in the pore volume due to grain growth. The crystallite size is obtained using the Scherrer equation. Specifically, the crystallite size can be determined using a method described in Examples, which will be described later.

In order to achieve the above-described composition and crystallite size of the powder of the present invention, the particle sizes of an yttrium source powder and an aluminum source powder as the starting materials can be adjusted or the firing temperature of the starting material powder can be adjusted, in a preferred method for producing the powder of the present invention, which will be described later.

Pore Volume

In the pore volume distribution relative to pore sizes as measured by mercury intrusion porosimetry (the particle size on the horizontal axis and the log differential intrusion volume on the vertical axis), the powder preferably exhibits at least one peak in a pore size range from 0.1 to 1 µm, in view of improving the corrosion resistance of a coating and a sintered material to be obtained from the powder of the present invention even more. More specifically, with regard to the peak(s) in the pore size range from 0.1 to 1 µm, it is more preferable that at least one peak be exhibited in a pore size range from 0.2 to 0.9 µm, and it is even more preferable that at least one peak be exhibited in a pore size range from 0.2 to 0.8 µm, in view of even more effectively improving the corrosion resistance. Hereinafter, a peak in the pore size range from 0.1 to 1 µm in the pore volume distribution may also be referred to as a pore first peak.

In the pore volume distribution relative to pore sizes as measured by mercury intrusion porosimetry (the particle size on the horizontal axis and the log differential intrusion volume on the vertical axis), the powder of the present invention preferably also exhibits at least one peak in the pore size range from 5 to 50 µm, in addition to the at least one peak in the pore size range from 0.1 to 1 µm, in view of improving the corrosion resistance even more. More specifically, with regard to the peak(s) in the pore size range from 5 to 50 µm, it is more preferable that at least one peak be exhibited in the pore size range from 7 to 35 µm, and it is even more preferable that at least one peak be exhibited in the pore size range from 8 to 25 µm, in view of improving the ease of production of the powder of the present invention and the corrosion resistance of the coating and the sintered material even more. Hereinafter, a peak in the pore size range from 5 to 50 µm in the pore volume distribution may also be referred to as a pore second peak.

The inventors of the present invention have found that, if the pore volume of the powder of the present invention is within a specific range, the surface roughness of a coating to be obtained and the denseness of a sintered material to be obtained can be controlled. In particular, the inventors of the present invention have found that the pore volume of the powder of the present invention within the specific range is particularly advantageous in the case where the powder of the present invention is the form of granules. The surface roughness of the coating and the denseness of the sintered material are correlated with the corrosion resistance against halogen-based plasma. Accordingly, the corrosion resistance of the coating and the sintered material can be controlled by controlling the pore volume of the powder of the present invention. Specifically, in the powder of the present invention, the volume of pores with a pore size from 0.1 to 1 µm is preferably at least 0.1 mL/g, as measured by mercury intrusion porosimetry. The volume of pores with a pore size from 0.1 to 1 µm is attributed to voids between primary particles of the powder of the present invention. When the volume of pores with a pore size within this range is at least 0.1 mL/g, a coating with reduced surface roughness can be obtained, or a dense sintered material can be obtained. The reason for this is not clear, however, the inventors of the present invention infer that one of the reasons is as follows: in the powder of the present invention having a pore volume within the above-described range, primary particles constituting granules are fine, and the powder has a certain pore volume, thereby efficiently transmitting heat to easily melt. By contrast, the thermal spraying powder disclosed in US 2006/182969A1 has a volume of pores with a pore size from 0.1 to 1 µm of 0.05 mL/g when determined from FIG. 1 of US 2006/182969A1, which is less than 0.1 mL/g and thus is out of the range of the pore volume according to the present invention.

The volume of pores with a pore size from 0.1 to 1 µm, V1, of the powder of the present invention is preferably 0.05 mL/g or greater, more preferably 0.10 mL/g or greater, and even more preferably 0.12 mL/g or greater. In view of preventing excessively large voids between primary particles to thereby prevent a decrease in the strength of the granules, the pore volume V1 is preferably 0.5 mL/g or less, more preferably 0.4 mL/g or less, and even more preferably 0.2 mL/g or less.

In view of improving the corrosion resistance, the volume of pores with a pore size from 5 to 50 µm, V2, of the powder of the present invention is preferably 0.1 mL/g or greater. The volume of pores with a pore size from 5 to 50 µm is attributed to voids between secondary particles of the powder of the present invention. The pore volume V2 of the powder of the present invention is more preferably 0.15 mL/g or greater, and even more preferably 0.20 mL/g or greater. In view of ensuring the fluidity, the pore volume V2 of the powder of the present invention is preferably 0.5 mL/g or less, and more preferably 0.4 mL/g or less.

In view of improving the corrosion resistance of a coating and a sintered material to be obtained by using the powder of the present invention even more, the value of the ratio of the pore volume V1 to the pore volume V2, V1/V2, of the powder of the present invention is preferably 0.3 or greater, more preferably 0.35 or greater, and even more preferably 0.4 or greater, as determined by mercury intrusion porosimetry. The value of V1/V2 is preferably 1.0 or less, and more preferably 0.85 or less, in view of ensuring an appropriate granule density.

In order to achieve the above-described pore volumes of the powder of the present invention, the particle sizes of the yttrium source powder and the aluminum source powder as the starting materials can be adjusted or the firing temperature of the starting material powder can be adjusted, in a preferred method for producing the powder of the present invention, which will be described later.

Granule Size

In view of increasing even more the corrosion-resistance-improving effect of the above-described specific pore volume or the above-described specific composition, the powder of the present invention is preferably granular. The granules have an average particle size of preferably 15 to 100 μm, more preferably 20 to 80 μm, even more preferably 20 to 60 μm, and most preferably 20 to 50 μm, in view of ease of obtaining the powder of the present invention that satisfies the above-described pore volume distribution, and also in view of good fluidity of the powder when used as a thermal spraying material. The average particle size above is the 50th percentile of the particle size on a volume basis ($D_{50}$) from the smaller particle size side as measured by laser diffraction and scattering particle size distribution analysis, and can be measured using a method described in Examples, which will be described later.

BET Specific Surface Area

The powder of the present invention preferably has a BET specific surface area of 1.0 to 5.0 $m^2/g$. With such a moderate BET specific surface area, the particles of the powder can easily melt during coating or sintering, thereby easily forming a dense coating or sintered material, and also the powder has a moderate bulk density, which improves the ease of handling thereof. From these viewpoints, the powder of the present invention more preferably has a BET specific surface area of 1.0 to 4.4 $m^2/g$, even more preferably 1.2 to 3.8 $m^2/g$, and further more preferably 1.4 to 3.2 $m^2/g$. The BET specific surface area is measured using a BET single point method. Specifically, the BET specific surface area can be measured using a method described in Examples, which will be described later.

Production Method

Next, a preferred method for producing the powder of the present invention will be described. Preferably, the production method includes Steps 1 to 3 below. Hereinafter, the individual steps will be described in detail.

Step 1: Aluminum source particles and yttrium source particles are mixed and pulverized to obtain a slurry of precursor mixed particles having a $D_{50}$ of 0.05 to 2.0 μm.

Step 2: The slurry obtained in Step 1 is granulated using a spray dryer to obtain a granulated product.

Step 3: The granulated product obtained in Step 2 is fired at a temperature of 800° C. to 1700° C. to obtain granules of an yttrium-aluminum complex oxide.

The production method including these steps can produce a stable phase of orthorhombic $YAlO_3$. The reasons for this are as follows; (a) as a result of mixing and pulverizing the aluminum source particles and the yttrium source particles and controlling the $D_{50}$ of the mixed particles in Step 1, the particles are sufficiently micronized and are highly reactive, and the dispersibility of the particles is maintained to keep the individual particles sufficiently adjacent to each other; and (b) The firing in Step 3 is performed at an appropriate temperature that is correlated with the $D_{50}$.

Step 1

In this step, aluminum source particles and yttrium source particles are mixed and pulverized to obtain a slurry with a predetermined particle size. With regard to the particle size of the precursor mixed particles, the $D_{50}$ is preferably from 0.05 to 2.0 μm. and more preferably from 0.1 to 1.0 μm, as measured using a laser diffraction and scattering particle size distribution analyzer, in view of successfully obtaining a powder having the above-described composition, pore volume, and specific surface area. The $D_{50}$ of the precursor mixed particles can be measured in the same manner as for the $D_{50}$ of granules. As the aluminum source, one or more compounds selected from the group consisting of aluminum oxide (alumina), aluminum oxyhydroxide, and aluminum hydroxide are preferably used.

With regard to the operation in Step 1, the aluminum source particles and the yttrium source particles are mixed with a liquid solvent, and the mixture is sufficiently stirred and pulverized to obtain a slurry of the precursor mixed particles. There is no particular limitation on the type of the liquid solvent, and, for example, any of water and various organic solvents can be used. With consideration given to the reactivity, the aluminum source is preferably in the form of microparticles. However, since the viscosity of the slurry increases with an increase in the specific surface area of the aluminum source, any of various dispersants and binders may be added to the slurry when the aluminum source particles are mixed with the liquid solvent. For example, a polyacrylic acid-based polymer, a carboxylic acid-based copolymer, acetic acid, or ammonia, can be used as the dispersants. In the case where a dispersant is added to the slurry of the aluminum source particles, the amount of dispersant added is preferably from 0.001 to 1 part by mass, and more preferably from 0.01 to 0.1 parts by mass, per 100 parts by mass of the aluminum source in terms of alumina, in view of, for example, improving the quality of the powder to be obtained and suppressing an increase in the viscosity.

With regard to the mixing ratio between the aluminum source and the yttrium source in this step, yttrium of the yttrium source is preferably greater than 0.8 mol and 1.3 mol or less, and more preferably greater than 0.95 mol and 1.05 mol or less, per 1 mol of aluminum of the aluminum source.

Either dry pulverization or wet pulverization can be used for the pulverization. The pulverization may be performed either in a single stage or in two or more stages. In terms of the cost and the time and labor, the pulverization is preferably performed in a single stage. After the pulverization, the liquid solvent such as water is preferably added to obtain a slurry. In the case where dry pulverization is performed, any of various types of dry pulverizers, such as a mortar machine, a jet mill, a ball mill, a hammer mill, and a pin mill, can be used. In the case where wet pulverization is performed, any of various types of wet pulverizers, such as a ball mill and a bead mill, can be used.

With regard to the concentration of the slurry in this step, the total concentration of the yttrium source in terms of yttria and the aluminum source in terms of alumina is preferably from 50 to 1500 g/L, and more preferably from 100 to 1000 g/L. When the concentration of the slurry is within this range, excessive energy consumption can be prevented, and also a slurry having an appropriate viscosity can be formed, thereby enabling stable spraying.

Step 2

In this step, the slurry obtained in Step 1 is granulated using a spray dryer to obtain a granulated product that contains yttrium and aluminum. During the operation of the spray dryer, the rotational speed of the atomizer is preferably from 5000 to 30000 $min^{-1}$. When the rotational speed is 5000 $min^{-1}$ or greater, the yttrium source particles and the aluminum source particles in the slurry can be sufficiently dispersed to thereby obtain a uniform granulated product. When the rotational speed is 30000 $min^{-1}$ or less, granules having the pore second peak described above are easily obtained. From these viewpoints, the rotational speed of the atomizer is more preferably from 6000 to 25000 $min^{-1}$.

During the operation of the spray dryer, the inlet temperature is preferably from 150° C. to 300° C. When the inlet temperature is 150° C. or higher, solid matter can be sufficiently dried to thereby easily obtain granules with little residual water. When the inlet temperature is 300° C. or lower, wasteful energy consumption can be prevented.

Step 3

In this step, the granulated product obtained in Step 2 is fired to obtain granules of an yttrium-aluminum complex oxide. The degree of the firing is a factor in controlling the composition, the peak(s) in the pore size range from 0.1 to 1 μm in the pore volume distribution, and the specific surface area, of the target powder. More specifically, the firing temperature is preferably from 800° C. to 1600° C. When the firing temperature is 800° C. or higher, the desired compositional ratio is easily achieved. When the firing temperature is 1600° C. or lower, granules having the desired first peak in the pore size distribution and the desired specific surface area are easily obtained. From these viewpoints, the firing temperature is more preferably from 900° C. to 1550° C., and even more preferably from 1000° C. to 1550° C.

When the firing temperature is within the above-described range, the firing time is preferably from 1 to 48 hours, and more preferably from 3 to 24 hours. There is no particular limitation on the firing atmosphere. However, since the aluminum source may need to be oxidized through firing depending on the type thereof, oxygen ($O_2$) may be needed for this purpose, and for such cases, it is preferable to perform the firing in an oxygen-containing atmosphere, such as the air.

The powder of the present invention obtained as described above can be used in various coating methods, such as thermal spraying, physical vapor deposition (PVD), chemical vapor deposition (CVD), aerosol deposition (AD), and cold spraying, and the powder of the present invention is preferably used in, for example, plasma spraying, which is a type of thermal spraying, and PVD. Plasma spraying may be atmospheric pressure plasma spraying or low pressure plasma spraying. PVD may be ion plating, sputtering, or the like. Examples of a substrate to be coated include those made of various metals such as aluminum, various alloys such as aluminum alloys, various ceramics such as alumina, and quartz.

The powder of the present invention can also be favorably used as the material of a ceramic component. More specifically, when the powder for coating or sintering of the present invention is used as the material for producing a ceramic component using, for example, an ordinary sintering method, a pressing method, HP, CIP, HIP, or SPS, a ceramic component with excellent smoothness and etching resistance can be obtained. Such a ceramic component can be favorably used in, for example, an electronic material and a jig used in firing for producing an electronic material, a member of a semiconductor equipment, and an etching apparatus and a coating apparatus that use plasma. A sintered material that is formed by sintering the powder for coating or sintering of the present invention can also be favorably used as a target (material for coating) in PVD, such as ion plating and vacuum evaporation.

By using the powder of the present invention, a thermal sprayed coating that has higher corrosion resistance against halogen-based plasma can be obtained, compared with using a conventional thermal spraying material of an yttrium-aluminum complex oxide. Also, the powder of the present invention can form a highly corrosion-resistant coating as well even when a method, such as PVD, other than thermal spraying is used. In addition, when the powder is sintered, a highly corrosion-resistant sintered material can be obtained. Since a coating or a sintered material obtained from the powder of the present invention is thus highly corrosion resistant, the coating or the sintered material is useful for, for example, a constituent member of a semiconductor equipment that employs halogen-based plasma, and a coating for such a member.

A coating and a sintered material obtained by using the powder of the present invention have a low etching rate in plasma etching with a halogen-based gas. Specifically, the coating and the sintered material preferably have an etching rate of 3 nm/min or less, and more preferably 2 nm/min or less, as measured using a method described in Examples, which will be described later.

In the case where a coating is produced from the powder of the present invention as the material, the coating preferably has low surface roughness in view of improvement in corrosion resistance against plasma etching with a halogen-based gas. The surface roughness of the coating can be measured using a method described in Examples, which will be described later.

EXAMPLES

Hereinafter, the present invention will be described in greater detail by way of examples. However, the scope of the present invention is not limited to the examples below.

Example 1

Step 1

6.2 kg of α-alumina and 13.8 kg of yttrium oxide together with pure water were subjected to wet stirring/pulverization to obtain a slurry of precursor mixed particles with a concentration of 500 g/L. The precursor mixed particles had a $D_{50}$ of 0.4 μm as measured using Microtrac HRA.

Step 2

The slurry obtained in Step 1 was granulated and dried using a spray dryer (manufactured by Ohkawara Kakohki Co., Ltd.) to obtain a granulated product. The conditions for operating the spray dryer were as follows:

Feed rate of slurry: 75 mL/min
Rotational speed of atomizer: 12500 rpm
Inlet temperature: 250° C.

Step 3

The granulated product obtained in Step 2 was placed in a container made of alumina, and fired in an atmosphere of air in an electric oven to obtain granules. The firing temperature was 1400° C., and the firing time was 6 hours. The granules had a substantially spherical shape. In this manner, a target powder was obtained.

Measurement and Coating Formation

Figure 1:
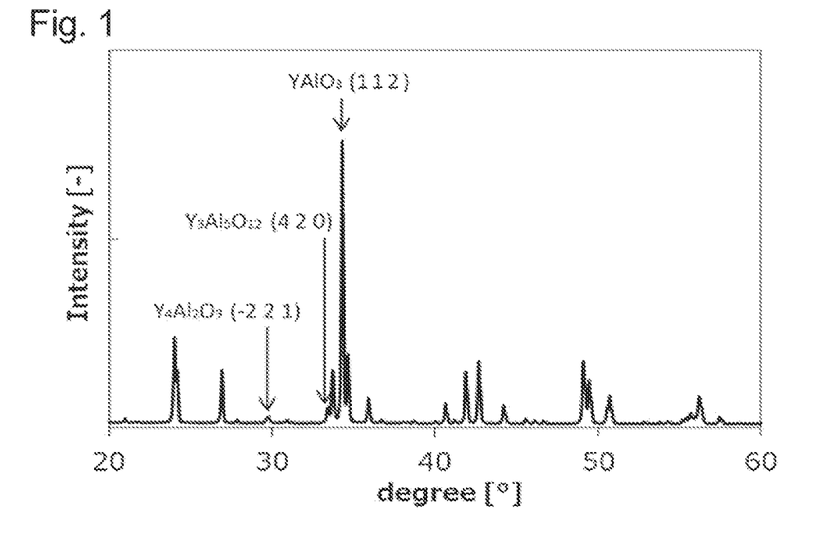
FIG. 1 is the XRD diffraction pattern of the powder obtained in Example 1.
Figure 2:
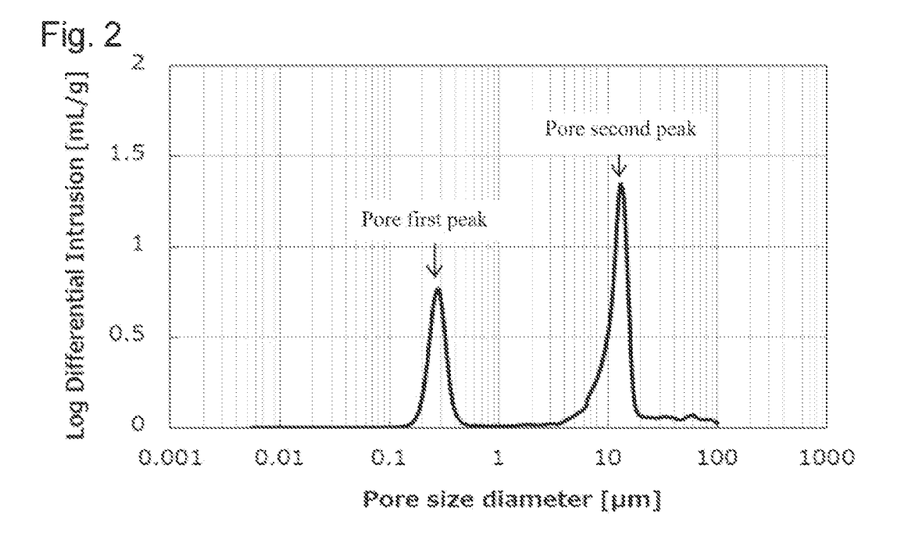
FIG. 2 is the chart of the pore size distribution of the powder obtained in Example 1.

The powder obtained in Example 1 was subjected to an X-ray diffractometry using a method described below to obtain an X-ray diffraction pattern, which is shown in FIG. 1. Based on the obtained X-ray diffraction pattern, relative intensities were calculated for the peak assigned to the (112) plane of orthorhombic $YAlO_3$, the peak assigned to the (420) plane of cubic $Y_3Al_5O_{12}$, the peak assigned to the (−221) plane of monoclinic $Y_4Al_2O_9$, the peak assigned to the (104) plane of trigonal $Al_2O_3$, and the peak assigned to the (222) plane of cubic $Y_2O_3$. Also, the pore first peak, the pore second peak, the pore volume, the crystallite size, the BET specific surface area, and the granule size ($D_{50}$) were measured according to the methods described below. Table 2 below shows the results. FIG. 2 shows the results of measurement of a pore size distribution. In the X-ray diffraction pattern within the scan range of 2θ=20° to 60° of the powder obtained in Example 1, no peaks assigned to components other than $YAlO_3$, $Y_3Al_5O_{12}$, or $Y_4Al_2O_9$ were exhibited.

X-Ray Diffractometry
- Diffractometer: Ultima IV (manufactured by Rigaku Corporation)
- X-ray source: CuKα radiation
- Tube voltage: 40 kV
- Tube current: 40 mA
- Scan speed: 2 deg/min
- Step: 0.02 deg
- Scan range: 2θ=20° to 60°

Pore First Peak, Pore Second Peak, Volume of Pores with Pore Size of 0.1 to 1 μm, and Volume of Pores with Pore Size of 5 to 50 μm
- Porosimeter: AutoPore IV (manufactured by Micromeritics)
- Pore first peak: When a pore size distribution of granules composed of primary particles is measured, two peaks are usually exhibited, and, of these peaks, the peak on the smaller diameter side is used as the first pore peak.
- Pore second peak: Of the above-described peaks, the peak on the larger diameter side is used as the second peak.
- Volume of pores with pore size of 0.1 to 1 μm: the integrated value of volumes of pores with a pore size from 0.1 to 1 μm
- Volume of pores with pore size of 5 to 50 μm: the integrated value of volumes of pores with a pore size from 5 to 50 μm Measurement of Crystallite Size The crystallite size was calculated using the Scherrer equation from the full width at half maximum of the peak assigned to the (112) plane of orthorhombic $YAlO_3$ in the X-ray diffractometry described above.

Measurement of BET Specific Surface Area

The BET specific surface area was measured according to a BET single point method using a fully automatic BET specific surface area analyzer. Macsorb model-1201, manufactured by Mountech Co., Ltd. A nitrogen-helium mixed gas (nitrogen: 30 vol %) was used.

Measurement of Granule Size

The granule size was measured using Microtrac D.H.S (HRA) Version 4.0 manufactured by MicrotracBEL Corp. To a 0.2 mass % sodium hexametaphosphate solution in pure water, granules were added until the instrument determined that the concentration was adequate, and then, the measurement was performed to obtain the value of $D_{50}$.

Conditions for Coating Through Thermal Spraying

A 20 mm square aluminum alloy plate was used as a substrate. Plasma spraying was performed on the surface of this substrate. TWIN-SYSTEM 10-V manufactured by Plasma-Technik AG was used as a feeder of the powder. F4 manufactured by Sulzer Metco AG was used as a plasma sprayer. The plasma spraying was performed to a coating thickness of about 60 μm, under the following conditions: stirring rotational speed, 50%; flow rate of carrier gas, 2.5 L/min: feed scale, 10%: plasma gas, Ar/$H_2$; output, 35 kW; and space between apparatus and substrate, 150 mm.

The coating obtained in Example 1 was subjected to X-ray diffractometry using the above-described method. As a result. S2/S1 was 0, S3/S1 was 0.07, and S4/S1 was 0.05. Also, no peaks assigned to components other than $YAlO_3$, $Y_3Al_5O_{12}$, $Y_4Al_2O_9$. $Al_2O_3$, or $Y_2O_3$ were exhibited.

Example 2

A powder of a complex oxide was obtained in the same manner as in Example 1, except that the firing temperature in Step 3 was 1500° C. Then, evaluation and coating formation were performed in the same manners as in Example 1.

Examples 3 and 5

Powders of complex oxides were obtained in the same manner as in Example 1, except that the amount of α-alumina in Step 1 was 6.5 kg for Example 3, and 5.9 kg for Example 5. Evaluation and coating formation were performed in the same manners as in Example 1.

Example 4

A powder of a complex oxide was obtained in the same manner as in Example 3, except that the firing temperature in Step 3 was 1500° C. Then, evaluation and coating formation were performed in the same manners as in Example 3.

Example 6

A powder of a complex oxide was obtained in the same manner as in Example 5, except that the firing temperature in Step 3 was 1500° C. Then, evaluation and coating formation were performed in the same manners as in Example 5.

Example 7

A powder of a complex oxide was obtained in the same manner as in Example 1, except that the rotational speed of the atomizer in Step 2 was 20000 rpm. Then, evaluation and coating formation were performed in the same manners as in Example 1.

Example 8

A powder of a complex oxide was obtained in the same manner as in Example 1, except that the rotational speed of the atomizer in Step 2 was 25000 rpm. Then, evaluation and coating formation were performed in the same manners as in Example 1.

Example 9

A powder of a complex oxide was obtained in the same manner as in Example 1, except the following: the aluminum source in Step 1 was changed to aluminum oxyhydroxide; the amount of aluminum oxyhydroxide used was 6.2 kg in terms of aluminum oxide; and the firing temperature in Step 3 was 1300° C. Then, evaluation and coating formation were performed in the same manners as in Example 1.

Example 10

A powder was obtained in the same manner as in Example 9, except that the firing temperature in Step 3 was 1200° C. Then, evaluation and coating formation were performed in the same manners as in Example 9.

Example 11

A powder of a complex oxide was obtained in the same manner as in Example 1 except that the aluminum source in Step 1 was changed to aluminum hydroxide, and that the amount of aluminum hydroxide used was 6.2 kg in terms of aluminum oxide. Then, evaluation and coating formation were performed in the same manners as in Example 1.

Example 12

A powder of a complex oxide was obtained in the same manner as in Example 11, except that the firing temperature in Step 3 was 1300° C. Then, evaluation and coating formation were performed in the same manners as in Example 11.

Comparative Example 1

A powder of a complex oxide was obtained using the production method disclosed in Example 1 of Japanese Patent No. 6659073. Then, evaluation and coating formation were performed for the obtained powder in the same manners as in Example 1. However, in the measurement of the crystallite size, the crystallite size was calculated from the peak assigned to the (420) plane of cubic $Y_3Al_5O_{12}$ in the present comparative example, instead of the peak assigned to the (112) plane of orthorhombic $YAlO_3$.

Comparative Example 2

An α-alumina powder was obtained in the same manner as in Example 1, except that the amount of α-alumina in Step 1 was 10 kg, and that yttrium oxide was not added. Then, evaluation and coating formation were performed in the same manners as in Example 1. However, in the measurement of the crystallite size, the crystallite size was calculated from the peak assigned to the (104) plane of trigonal $Al_2O_3$ in the present comparative example, instead of the peak assigned to the (112) plane of orthorhombic $YAlO_3$.

For the coatings formed in Examples and Comparative Examples, the surface roughness and the etching rate were measured using the following methods.

Measurement of Surface Roughness of Coatings

The surface roughness of the coating formed on the aluminum alloy plate was measured using the following method.

The arithmetic mean roughness (Ra) and the maximum height roughness (Rz) (JIS B 0601:2001) were obtained using a stylus instrument for measuring surface roughness (JIS B 0651:2001). A stylus profiler P-7 manufactured by KLA-Tencor was used as the stylus instrument. The measurement was performed under the conditions of a sampling length of 5 mm and a measurement speed of 100 μm/s. An average of the found values at three points was obtained.

Measurement of Plasma Etching Rate

A piece of Kapton tape was attached to half of the coating formed on the aluminum alloy plate. Then, the aluminum alloy plate was placed in a chamber of an etching apparatus (RIE-10NR manufactured by Samco Inc.) with the coating facing upward, and plasma etching was performed. The conditions for the plasma etching were as described below. The etching gas ($CF_4/O_2$) used contained a larger amount of halogen-based gas than the etching gas ($CF_4/O_2/Ar$) used in Japanese Patent No. 6659073, and therefore, even higher resistance to halogen-based plasma was required here.

The step height between the plasma-exposed surface and the non-exposed surface, from which the tape had been detached after the plasma irradiation, was measured using the above-described method of the measurement of the surface roughness, and the etching rate was calculated therefrom. Measurements were performed at three measurement points for each coating, and an average value of the found values at the three points was calculated.

Atmospheric gas: $CF_4/O_2$=50/5 (cc/min)
High frequency power: RF 300 W
Pressure: 10 Pa
Etching time: 5 hours

TABLE 1

| | Aluminum material | $Al_2O_3$ [kg] | $Y_2O_3$ [kg] | Rotational speed of atomizer (rpm) | Firing temperature (° C.) |
|---|---|---|---|---|---|
| Ex. 1 | Alumina | 6.2 | 13.8 | 12500 | 1400 |
| Ex. 2 | Alumina | 6.2 | 13.8 | 12500 | 1500 |
| Ex. 3 | Alumina | 6.5 | 13.8 | 12500 | 1400 |
| Ex. 4 | Alumina | 6.5 | 13.8 | 12500 | 1500 |
| Ex. 5 | Alumina | 5.9 | 13.8 | 12500 | 1400 |
| Ex. 6 | Alumina | 5.9 | 13.8 | 12500 | 1500 |
| Ex. 7 | Alumina | 6.2 | 13.8 | 20000 | 1400 |
| Ex. 8 | Alumina | 6.2 | 13.8 | 25000 | 1400 |
| Ex. 9 | Aluminum oxyhydroxide | 6.2 | 13.8 | 12500 | 1300 |
| Ex. 10 | Aluminum oxyhydroxide | 6.2 | 13.8 | 12500 | 1200 |
| Ex. 11 | Aluminum hydroxide | 6.2 | 13.8 | 12500 | 1400 |
| Ex. 12 | Aluminum hydroxide | 6.2 | 13.8 | 12500 | 1300 |
| Com. Ex. 1 | Alumina | 10.0 | 14.0 | 12500 | 1400 |
| Com. Ex. 2 | Alumina | 10.0 | 0 | 12500 | 1400 |

TABLE 2

| | Relative intensity of X-ray diffraction peak | | | | | | | | | Pore first peak (μm) | Pore second peak (μm) |
|---|---|---|---|---|---|---|---|---|---|---|---|
| | $YAlO_3$ (S1) | $Al_2O_3$ (S2) | $Y_3Al_5O_{12}$ (S3) | $Y_4Al_2O_9$ (S4) | $Y_2O_3$ (S5) | S2/S1 | S3/S1 | S4/S1 | S5/S1 | | |
| Ex. 1 | 100 | 0 | 7 | 4 | 0 | 0 | 0.07 | 0.04 | 0 | 0.28 | 12.9 |
| Ex. 2 | 100 | 0 | 7 | 4 | 0 | 0 | 0.07 | 0.04 | 0 | 0.33 | 13.9 |
| Ex. 3 | 100 | 0 | 14 | 0 | 0 | 0 | 0.14 | 0 | 0 | 0.32 | 15.1 |
| Ex. 4 | 100 | 0 | 15 | 0 | 0 | 0 | 0.15 | 0 | 0 | 0.38 | 15.1 |
| Ex. 5 | 100 | 0 | 0 | 16 | 0 | 0 | 0 | 0.16 | 0 | 0.31 | 15.1 |
| Ex. 6 | 100 | 0 | 0 | 15 | 0 | 0 | 0 | 0.15 | 0 | 0.38 | 13.9 |
| Ex. 7 | 100 | 0 | 6 | 6 | 0 | 0 | 0.06 | 0.06 | 0 | 0.30 | 10.0 |
| Ex. 8 | 100 | 0 | 7 | 4 | 0 | 0 | 0.07 | 0.04 | 0 | 0.29 | 6.5 |
| Ex. 9 | 100 | 0 | 7 | 4 | 0 | 0 | 0.07 | 0.04 | 0 | 0.35 | 15.1 |
| Ex. 10 | 100 | 0 | 9 | 8 | 0 | 0 | 0.09 | 0.08 | 0 | 0.31 | 15.1 |
| Ex. 11 | 100 | 0 | 5 | 6 | 0 | 0 | 0.05 | 0.06 | 0 | 0.34 | 13.9 |
| Ex. 12 | 100 | 0 | 7 | 8 | 0 | 0 | 0.07 | 0.08 | 0 | 0.28 | 13.9 |

TABLE 2-continued

| | | | | | | | | | | | | |
|---|---|---|---|---|---|---|---|---|---|---|---|---|
| Com. Ex. 1 | 5 | — | 100 | 0 | 2 | 0 | 20.00 | 0 | 0.40 | | 0.31 | 15.1 |
| Com. Ex. 2 | — | (100) | — | — | — | — | — | — | — | | 0.38 | 13.9 |

| | Volume of pores, V1 * (mL/g) | Volume of pores, V2 ** (mL/g) | V1/V2 | Crystallite size (nm) | BET specific surface area (m²/g) | Granule size (μm) | Surface roughness of coating (μm) Ra | Surface roughness of coating (μm) Rz | Etching rate (nm/min) |
|---|---|---|---|---|---|---|---|---|---|
| Ex. 1 | 0.15 | 0.30 | 0.50 | 84 | 1.9 | 42 | 4.2 | 40 | 1.4 |
| Ex. 2 | 0.13 | 0.29 | 0.45 | 98 | 1.5 | 42 | 4.7 | 49 | 1.6 |
| Ex. 3 | 0.19 | 0.33 | 0.58 | 88 | 2.2 | 45 | 4.6 | 47 | 1.5 |
| Ex. 4 | 0.16 | 0.30 | 0.53 | 104 | 1.8 | 45 | 4.5 | 51 | 1.7 |
| Ex. 5 | 0.18 | 0.31 | 0.58 | 84 | 2.0 | 45 | 4.2 | 41 | 2.0 |
| Ex. 6 | 0.14 | 0.30 | 0.47 | 102 | 1.7 | 44 | 4.4 | 44 | 2.1 |
| Ex. 7 | 0.22 | 0.32 | 0.69 | 88 | 2.2 | 32 | 4.3 | 40 | 1.5 |
| Ex. 8 | 0.21 | 0.28 | 0.75 | 83 | 2.4 | 22 | 4.9 | 42 | 1.8 |
| Ex. 9 | 0.19 | 0.32 | 0.59 | 95 | 2.1 | 44 | 4.8 | 52 | 1.8 |
| Ex. 10 | 0.22 | 0.34 | 0.65 | 86 | 2.5 | 43 | 4.4 | 50 | 2.2 |
| Ex. 11 | 0.21 | 0.31 | 0.68 | 90 | 2.3 | 42 | 5.0 | 54 | 2.0 |
| Ex. 12 | 0.25 | 0.33 | 0.76 | 81 | 2.7 | 43 | 4.9 | 50 | 2.1 |
| Com. Ex. 1 | 0.23 | 0.34 | 0.68 | 86 | 2.5 | 44 | 4.5 | 48 | 3.4 |
| Com. Ex. 2 | 0.19 | 0.38 | 0.50 | 88 | 2.4 | 44 | 5.2 | 54 | 28.0 |

\* V1: Volume of pores with pore size from 0.1 to 1 μm
\*\* V2: Volume of pores with pore size from 5 to 50 μm As is clear from the results shown in Table 2, the coatings that were formed by using the powders obtained in Examples had smaller etching rates compared with the coatings that were formed by using the powders obtained in Comparative Examples, and it is thus found that the coatings that were formed by using the powders obtained in Examples had high corrosion resistance against plasma etching with a halogen-based gas.

INDUSTRIAL APPLICABILITY

With the use of the powder for coating or sintering of the present invention, a coating or a sintered material that is highly corrosion resistant against plasma etching with a halogen-based gas can be easily formed.

The invention claimed is:

1. A powder for coating or sintering,
wherein, in an X-ray diffractometry of the powder, a peak assigned to orthorhombic $YAlO_3$, and a peak assigned to cubic $Y_3Al_5O_{12}$ or monoclinic $Y_4Al_2O_9$ are exhibited,
of peaks exhibited in the X-ray diffractometry, a peak assigned to a (112) plane of orthorhombic $YAlO_3$ is a peak that has the highest peak intensity,
in an X-ray diffractometry using CuKα radiation, a value of a ratio of S3 to S1, S3/S1, and a value of a ratio of S4 to S1, S4/S1, are each independently less than 1, where S1 represents a peak intensity of a peak assigned to a (112) plane of orthorhombic $YAlO_3$, S3 represents a peak intensity of a peak assigned to a (420) plane of cubic $Y_3Al_5O_{12}$, and S4 represents a peak intensity of a peak assigned to a (−221) plane of monoclinic $Y_4Al_2O_9$, and
in a pore volume distribution relative to pore sizes as measured by mercury intrusion porosimetry, the powder exhibits at least one peak in each of a range of pore sizes from 0.1 to 1 μm and a range of pore sizes from 5 to 50 μm, a volume of pores with a pore size from 0.1 to 1 μm is 0.1 mL/g or greater, and a volume of pores with a pore size from 5 to 50 μm is 0.1 mL/g or greater.

2. The powder for coating or sintering according to claim 1,
wherein, in the X-ray diffractometry of the powder, no peak assigned to trigonal $Al_2O_3$ is exhibited, or if a peak assigned to trigonal $Al_2O_3$ is exhibited, a value of a ratio of S2 to S1, S2/S1, is less than 1 in an X-ray diffractometry using CuKα radiation, where S1 represents a peak intensity of a peak assigned to a (112) plane of orthorhombic $YAlO_3$ and S2 represents a peak intensity of a peak assigned to a (104) plane of trigonal $Al_2O_3$.

3. The powder for coating or sintering according to claim 1,
wherein, in the X-ray diffractometry of the powder, no peak assigned to cubic $Y_2O_3$ is exhibited, or if a peak assigned to cubic $Y_2O_3$ is exhibited, a value of a ratio of S5 to S1, S5/S1, is 1 or less in an X-ray diffractometry using CuKα radiation, where S1 represents a peak intensity of a peak assigned to a (112) plane of orthorhombic $YAlO_3$, and S5 represents a peak intensity of a peak assigned to a (222) plane of cubic $Y_2O_3$.

4. The powder for coating or sintering according to claim 1, having a crystallite size of 50 nm or greater as determined from a full width at half maximum of the peak assigned to a (112) plane of orthorhombic $YAlO_3$ in the X-ray diffractometry of the powder.

5. The powder for coating or sintering according to claim 1, having a BET specific surface area of 1 to 5 m²/g.

6. The powder for coating or sintering according to claim 1, wherein the powder is granular and has an average particle size of 15 μm or greater.

7. A method for producing a coating, comprising forming a coating of the powder for coating or sintering according to claim 1 by thermal spraying or PVD.

\* \* \* \* \*